(12) United States Patent
Hamberger et al.

(10) Patent No.: US 11,933,912 B2
(45) Date of Patent: Mar. 19, 2024

(54) TEST SYSTEM FOR TESTING A RADAR SENSOR

(71) Applicant: Rohde & Schwarz GmbH & Co. KG, Munich (DE)

(72) Inventors: Gerhard Hamberger, Munich (DE); Matthias Beer, Munich (DE); Benoit Derat, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 324 days.

(21) Appl. No.: 16/862,310

(22) Filed: Apr. 29, 2020

(65) Prior Publication Data
US 2021/0341572 A1   Nov. 4, 2021

(51) Int. Cl.
*G01S 7/40* (2006.01)

(52) U.S. Cl.
CPC .............. *G01S 7/4052* (2013.01); *G01S 7/40* (2013.01); *G01S 7/4069* (2021.05)

(58) Field of Classification Search
CPC ......... G01S 7/4052; G01S 7/40; G01S 7/4069
USPC ........................................................ 342/169
See application file for complete search history.

(56) References Cited

U.S. PATENT DOCUMENTS

| | | | |
|---|---|---|---|
| 4,733,236 A * | 3/1988 | Matosian | H01Q 15/18 342/52 |
| 4,990,923 A * | 2/1991 | Delfeld | G01S 7/4052 342/4 |
| 5,138,325 A * | 8/1992 | Koury | G01S 7/4052 342/174 |
| 5,721,554 A * | 2/1998 | Hall | G01S 7/4052 342/170 |
| 6,114,985 A * | 9/2000 | Russell | G01S 7/4052 342/173 |
| 6,903,910 B1 * | 6/2005 | Griesing | G01R 29/0821 361/38 |
| 7,648,164 B2 * | 1/2010 | Breed | B60N 2/02246 280/736 |
| 8,466,831 B2 * | 6/2013 | Pierno | H01Q 3/2676 342/174 |
| 8,786,490 B2 * | 7/2014 | Borosak | G01S 7/022 342/174 |
| 9,151,828 B2 * | 10/2015 | Shipley | H01Q 21/225 |
| 10,866,308 B2 * | 12/2020 | Salvesen | G01S 7/285 |
| 11,313,958 B2 * | 4/2022 | Kong | G01S 7/4052 |

(Continued)

FOREIGN PATENT DOCUMENTS

| | | | | |
|---|---|---|---|---|
| CN | 206281970 U | * | 6/2017 | ............ G01S 7/40 |
| DE | 102018217173 A1 | * | 4/2020 | ............ H01Q 19/10 |

(Continued)

*Primary Examiner* — Nuzhat Pervin
(74) *Attorney, Agent, or Firm* — CHRISTENSEN O'CONNOR JOHNSON KINDNESS PLLC

(57) ABSTRACT

A test system for testing a radar sensor comprising a test chamber for encompassing a radar sensor to be tested. A test location is provided within the test chamber on which the radar sensor to be tested is placed for testing. Further, the test system comprises at least one antenna unit and at least one first radar target simulator connected to the antenna unit. The test system also comprises at least one antenna array different to the antenna unit and at least one second radar target simulator connected to the antenna array.

19 Claims, 1 Drawing Sheet

(56) References Cited

U.S. PATENT DOCUMENTS

| | | | | |
|---|---|---|---|---|
| 11,644,536 B2* | 5/2023 | Salvesen | ............... | G01S 7/4052 342/174 |
| 2008/0088501 A1* | 4/2008 | Chandler | .............. | G01S 7/4052 342/51 |
| 2008/0224919 A1* | 9/2008 | Walker | .................... | G01S 7/025 342/174 |
| 2008/0224920 A1* | 9/2008 | Walker | ................. | G01S 7/4052 342/174 |
| 2012/0007770 A1* | 1/2012 | Walker | ................. | G01S 7/4052 342/174 |
| 2012/0098696 A1* | 4/2012 | Borosak | ................ | G01S 7/4052 342/169 |
| 2013/0002474 A1* | 1/2013 | Shipley | ................ | H01Q 21/225 342/171 |
| 2015/0358337 A1* | 12/2015 | Keller | ................ | H04W 12/128 726/23 |
| 2015/0369905 A1* | 12/2015 | Shipley | ............... | H01Q 21/225 342/171 |
| 2017/0363719 A1* | 12/2017 | Ahmed | ................ | G01S 7/4052 |
| 2019/0041496 A1* | 2/2019 | Salvesen | ............... | G01S 7/4052 |
| 2020/0212589 A1* | 7/2020 | Cobb | .................... | G01S 7/4052 |
| 2020/0319325 A1* | 10/2020 | Kong | .................... | G01S 7/4021 |
| 2020/0371207 A1* | 11/2020 | Cai | ........................ | G01S 7/4026 |
| 2021/0055382 A1* | 2/2021 | Kong | .................... | G01S 7/4052 |
| 2021/0116538 A1* | 4/2021 | Salvesen | ............... | G01S 7/4052 |

FOREIGN PATENT DOCUMENTS

| | | | | |
|---|---|---|---|---|
| EP | 1034442 B1 * | 2/2009 | ........... | G01S 7/4052 |
| EP | 3572821 A1 * | 11/2019 | ........... | G01R 29/105 |
| WO | WO-2020074772 A1 * | 4/2020 | ......... | G01R 29/0878 |

* cited by examiner

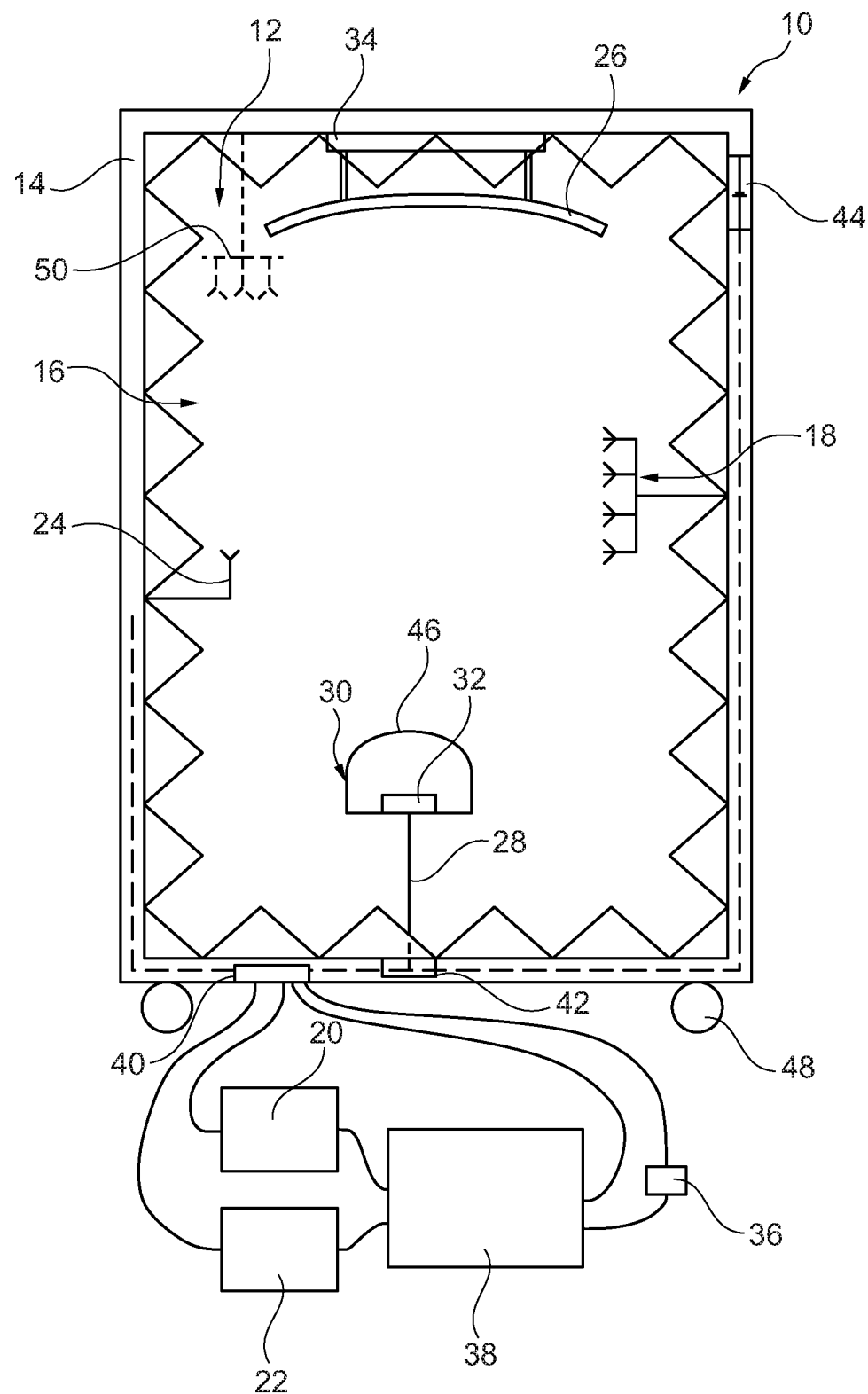

TEST SYSTEM FOR TESTING A RADAR SENSOR

FIELD OF THE DISCLOSURE

Embodiments of the present disclosure generally relate to a test system for testing a radar sensor.

BACKGROUND

In the state of the art, it is known to calibrate radar sensors, in particular multiple-input multiple-output (MIMO) radar sensors, in large far-field measurement facilities.

Furthermore, hardware-in-the-loop systems are known which are utilized to evaluate "real-world" scenarios, possibly with multi-targets and dynamic scenarios. For instance, moving antennas are proposed for testing a radar sensor in dynamic scenarios. Moreover, multiple target solutions with fixed positions are known.

However, different tests and test scenarios require different test systems or rather different setups, resulting in high costs for providing the respective hardware.

Accordingly, there is a need for a cost-efficient and compact test system that enables different tests efficiently.

SUMMARY

The present disclosure provides a test system for testing a radar sensor. In an embodiment, the test system comprises a test chamber for encompassing a radar sensor to be tested. A test location is provided within the test chamber on which the radar sensor to be tested is placed for testing. The test system further comprises at least one antenna unit and at least one first radar target simulator connected to the antenna unit. The test system also comprises at least one antenna array different to the antenna unit and at least one second radar target simulator connected to the antenna array.

Accordingly, two different radar target simulators as well as two different antenna systems, namely the antenna unit and the antenna array, are provided in a single test system. The antenna unit and the corresponding radar target simulator as well as the antenna array and the corresponding radar target simulator each establish a radar simulation module that can be used for different testing purposes. Put differently, a combined test system is provided since the test system comprises calibration capabilities and hardware-in-the-loop capabilities.

Generally, the antenna array together with the second radar target simulator may provide a bandwidth up to 4 GHz and/or may support testing of 24 GHz band, 77 GHz band as well as 79 GHz band which are used for automotive radar testing.

Accordingly, the second radar target simulator may be assigned to an Automotive Radar Echo Generator (AREG) that is used for testing automotive radar sensors. A respective AREG frontend may be provided that is associated with the second radar target simulator.

In some embodiments, the test chamber is substantially cuboid. The largest side of the cuboid chamber is smaller than 2.5 meters such that the overall dimensions of the test system are small. In other words, the test system has a relatively small footprint, ensuring that it can be used at different facilities.

A common radar target simulation circuit or module may be provided that encompasses the first radar target simulator and the second radar target simulator.

Generally, the test location may be associated with a quiet zone such that the radar sensor to be tested is located in a quiet zone.

According to an aspect, the antenna unit comprises a reflector and an antenna associated with the reflector such that plane waves are provided at the test location. Hence, the test system comprises a compact antenna test range (CATR). Typically, the CATR is used for performing a calibration of the radar sensor to be tested. The antenna may be a feed antenna.

Generally, the reflector corresponds to a bidirectional component since it can be used for reflecting signals from the antenna towards the test location or signals from the radar sensor located at the test location towards the antenna. In other words, the reflector may transform a spherical field from a focal point, namely the antenna, into a planar wave at the test location, thereby providing the quiet zone. Further, the reflector may correspond to a spatial filter that extracts planar components of spherical waves from radar sensor to be tested and focuses them at a focal point, namely the antenna.

Accordingly, the antenna may be orientated and/or located with respect to the corresponding reflector such that the antenna is located in the focal point of the reflector.

Another aspect provides that the reflector is located within the test chamber at an upper side of the test chamber, wherein the upper side is opposite to a lower side that is assigned to the test location. The distance between the upper side and the lower side corresponds to the largest side of the test chamber, ensuring far-field conditions at the test location even though the test system has small dimensions.

The reflector may be gold plated and/or the reflector may have a surface roughness below 1 μm (RMS—root mean square). Hence, good reflective properties of the reflector are ensured. The low surface roughness reduces errors when reflecting signals since less signal portions are reflected into undesired directions. In some embodiments, signals with high frequencies can be used for testing appropriately, for instance frequencies up to 100 GHz.

The reflector may provide a cylindrical quiet zone having a diameter of 30 cm. The quiet zone is large enough to accommodate a typical radar sensor to be tested completely.

According to a further aspect, an alignment module for the reflector is provided within the test chamber. The alignment module is used to align the reflector with respect to the test location and/or the antenna. The alignment module may be connected with the upper side. For instance, the alignment module may ensure that the reflector is tilted while maintaining its location with respect to the respective side. However, the alignment module may also ensure that the reflector is moved laterally along the respective side.

Moreover, the alignment module may run along at least two sides in a continuous manner such that the reflector can be located at different sides if required for testing purposes.

In some embodiments, the alignment module includes one or more angular and/or linear stages for aligning the reflector with respect to the test location and/or the antenna.

In some embodiments, the alignment module may be controlled by processing circuit or unit such that no manual aligning of the reflector is required.

The antenna unit may comprise an antenna array that is configured to provide plane waves at the test location in a synthesized manner. The quiet zone can also be established by an antenna array that comprises several antennas which are controlled appropriately with regard to phase and/or amplitude. In some embodiments, the antennas of the antenna array are controlled such that they each generate a wave, wherein the respective waves generated superimpose with each other, resulting in plane waves at the test location. Hence, the plane waves are obtained in a synthesized manner due to the respective controlling of the individual antennas of the antenna array.

According to another aspect, the second antenna array and the second radar target simulator together are configured to generate multiple dynamic target scenarios for testing the radar sensor to be tested. The second target simulator may be established as a multi-target simulator, for instance an Automated Radar Terminal System (ARTS). The second antenna array corresponds to a so-called quality automotive tester (QAT). In some embodiments, the test system, for example the second antenna array together with the second radar target simulator, can be used to identify the minimum angular distance between two targets in order to reliably detect them as two separate targets.

In some embodiments, the antenna array comprises several transmission antennas and several reception antennas. The several transmission and reception antennas ensure that the antenna array can be used for different testing purposes. In some embodiments, the reaction of the radar sensor to be tested on certain test scenarios can be evaluated easily. For instance, 96 transmission antennas (Tx) and 96 reception antennas (Rx) are provided.

In some embodiments, the antenna array comprises several antennas that may be arranged in a row and/or in a column. For instance, the several antennas are located in a two-dimensional area.

Another aspect provides that the test system comprises a power sensor that is configured to sense the power of a signal provided by the radar sensor to be tested. Hence, the transmission power of a radar sensor to be tested can be sensed appropriately.

Furthermore, an equivalent isotropically radiated power (EIRP) can be determined by the test system while using the power sensor.

The power sensor may be associated with a frontend that provides an intermediate frequency output with which the power sensor is connected. The power sensor may have an upper frequency limit of 6 GHz. Hence, the respective frontend ensures that the frequency of the radar signals issued by the radar sensor to be tested, which is typically assigned to the ISM band or the E band, is down-converted into the respective intermediate frequency (IF) band which might be between 0.7 GHz and 4.7 GHz.

According to another aspect, the test system comprises a movable positioner for the radar sensor to be tested. The test location is assigned to the positioner. The positioner is configured to move the radar sensor within the test chamber. The movable positioner ensures that the radar sensor to be tested can be moved during the measurement or rather between different measurement steps. In some embodiments, the positioner is a 3D positioner, for instance a 3D tilt-tilt positioner. The positioner provides an angular range associated with elevation of ±45° and/or associated with azimuth of ±180°. The angular resolution of the movable position may be 0.03°.

The positioner can be controlled to reach its respective measurement position, wherein a measurement is automatically initiated once the positioner and the radar sensor to be tested located thereon has reached the respective measurement position.

In order to improve the testing time, the positioner may have a maximum rotation speed of 120°/s.

The test system may have an outer housing that limits the test chamber outwardly. The outer housing has walls associated with the respective sides of the test chamber. In some embodiments, the walls of the outer housing define the sides of the testing chamber. Accordingly, the reflector is located at the upper inner wall of the outer housing. The outer housing may have a door such that the radar sensor to be tested can be easily placed within the test chamber.

In some embodiments, wheels are provided at the outer housing, establishing a movable test chamber. Accordingly, the entire test chamber can be moved easily.

Another aspect provides that the outer housing comprises an access panel at its outer side, wherein a chamber access panel for the radar sensor to be tested is provided within the test chamber. The respective access panel ensure that no cables are located within the test chamber that might have an influence on the testing of the radar sensor. The access panels provide standard feedthroughs for the required connections, for instance power and control.

In some embodiments, the access panel at the outer side and/or the chamber access panel may comprise an Ethernet interface to control the positioner and/or the radar sensor, a DSUB interface for the radar sensor to be tested, a USB interface for the radar sensor to be tested, banana jacks for a power supply, a power filter and/or a BNC interface for a trigger.

Moreover, the test chamber may be an anechoic chamber or a shielded chamber. This ensures that the testing is not disturbed by any external influences. The shielding effectiveness may be higher than 90 dB.

In addition, the test chamber is established such that extremely low reflections occur in order to eliminate ghost targets during the testing.

Furthermore, the test system may comprise a ventilation system that is assigned to the test chamber for ventilating an interior of the test chamber. The ventilation system is used to avoid a heating within the test chamber during a testing procedure that lasts long. In some embodiments, the ventilation system ensures that the temperature within the test chamber is maintained stable.

In some embodiments, the test system comprises an environment conditioning module that is assigned to the test location, wherein the environment conditioning module is configured to adapt an environmental condition for the radar sensor to be tested in a defined manner. The environment conditioning module may be used to provide a defined humidity and/or temperature at the test location such that different testing scenarios with regard to environmental impacts can be performed. In some embodiments, the environment conditioning module can be used to provide a temperature at the test location that is different to the one within the remainder of the test chamber, namely outside of the test location. For instance, the environment conditioning module may provide a temperature range from −40° C. up to 85° C.

Generally, the antenna unit and the antenna array may be configured to be activated independently from each other. Hence, only one of the antenna systems, namely the antenna unit or the antenna array, may be active for a respective testing scenario. Depending on the testing scenario intended, the antenna systems are activated independently of each other.

The test system may comprise a first operation mode in which only the antenna unit is operated. The antenna unit may be used for calibration tests. Hence, the first operation mode may correspond to an angular calibration of the radar sensor to be tested. This relates to a typical far-field task with one target which needs to be performed with a plane wave incident on the radar sensor to be tested. Accordingly, the antenna unit together with the first radar target simulator are used in the first operation mode.

The test system may comprise a second operation mode in which only the antenna array is operated. The antenna array may be used for multi-target tests. In some embodiments, a minimum angular distance between two targets is determined in order to reliably detect them as two separate targets. This relates to a typical test scenario in a Hardware-in-Loop system (HiL system). Accordingly, the antenna array together with the second radar target simulator are used in the first operation mode.

The test system may comprise a third operation mode in which the antenna unit and the antenna array are operated simultaneously. Hence, both above-mentioned scenarios may be performed at the same time (concurrently).

The test system may be configured to perform a multi-target test and a radar calibration. As mentioned above, the respective tests can be performed in different operation modes or during a common operation mode, namely the third operation mode. Thus, these tests may be performed subsequently or concurrently.

In addition, the test system may be configured to perform an interference test. Hence, the test system comprises an interferer generation module for simulating an interferer. This can be used for testing the robust of the radar sensor against interfering signals. The interferer generation module may be integrated within one of the radar target simulators. Hence, an echo signal together with an interfering signal may be provided and forwarded to the radar sensor to be tested.

The test system comprises a control and/or evaluation circuit or module. The control and/or evaluation module may be connected with the radar target simulators, the antenna unit, the antenna system, the alignment module, the power sensor, the positioner, the ventilation system, the environment conditioning module and/or the radar sensor to be tested. The control and/or evaluation module may forward control signals to the respective components. Moreover, the control and/or evaluation module may also receive signals from the respective components for evaluation purposes. The control and/or evaluation module may be associated with a signal and spectrum analyzer and/or a vector signal generator.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

The FIGURE shows a schematic overview of a representative test system according to the present disclosure.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The FIGURE shows a test system 10 for testing purposes that comprises a test chamber 12 encompassed by an outer housing 14. The test chamber 12 is an anechoic chamber or a shielded chamber such that external influences on the testing performed can be suppressed effectively.

In the test chamber 12, an antenna unit 16 as well as an antenna array 18 are provided that are connected with a first radar target simulator 20 and a second radar target simulator 22 respectively. The radar target simulators 20, 22 are located outside of the test chamber 12. The purposes of the different radar target simulators 20, 22 will be described later.

The antenna unit 16 comprises an antenna 24 and a reflector 26 that is associated with the antenna 24. In other words, the antenna 24 is orientated towards the reflector 26 such that the antenna 24 is located in the focal point of the reflector 26. For example, the antenna 24 is established as a feed antenna.

The antenna array 18 comprises several antennas, for example several transmission antennas and several reception antennas. The several antennas may be arranged in a row and/or in a column. For instance, the several antennas are located in a two-dimensional area or array.

In general, the antenna unit 16 and the antenna array 18 relate to two different antenna systems which are provided in a single test system 10.

The antenna unit 16 and the first radar target simulator 20 as well as the antenna array 18 and the second radar target simulator 22 each establish a respective radar simulation module that can be used for different testing purposes as will be described later.

In addition, the test system 10 comprises a positioner 28 that is located at a test location 30 within the test chamber 12, wherein a radar sensor 32 under test (RUT) is located on the test location 30.

In the shown embodiment, the positioner 28 is established as a three dimensional positioner (3D positioner) such that the radar sensor 32 under test, also called the radar sensor to be tested, can be moved within the test chamber 12 in order to test different angular orientations. For instance, the positioner 28 is established as a 3D tilt-tilt positioner.

In some embodiments, the radar sensor 32 interacts with the antenna unit 16 and/or the antenna array 18 during a respective test scenario as will be described later in more detail.

As shown in the FIGURE, the test location 30 is assigned to a lower side within the test chamber 12, whereas the reflector 26 is located at an inner upper wall of the outer housing 14 within the test chamber 12. Accordingly, a (maximum or large) distance within the test chamber 12 is provided between the test location 30 and the reflector 26.

Generally, the antenna 24 together with the reflector 26 ensure that plane waves are provided at the test location 30 such that the radar sensor 32 is located in a quiet zone, for instance a cylindrical one that has a diameter of 30 cm. The quiet zone is large enough to accommodate typical radar sensors completely, for example MIMO radar sensors.

The reflector 26 generally transforms a spherical field from a focal point, namely the antenna 24, into a planar wave at the test location 30, thereby providing the quiet zone which ensures proper testing of the radar sensor 32. In some embodiments, far-field conditions are provided at the test location 30 even though the test chamber 12 itself has small dimensions. The far-field conditions however are ensured due to the interaction of the antenna 24 and the reflector 26 since the reflector 26 enlarges the distance between the antenna 24 and the radar sensor 32 for the electromagnetic waves exchanged for testing purposes.

In addition, the reflector 26 also extracts planar components of spherical waves provided by the radar sensor 32 and focuses them at a focal point, namely the antenna 24. Hence, the reflector 26 can be used for transmission and reception tests of the radar sensor 32.

In some embodiments, the test system 10 comprises an alignment module 34 with which the reflector 26 is coupled. The alignment module 34 generally ensures that the reflector 26 can be orientated and/or laterally displaced with respect to the outer housing 14. In some embodiments, the alignment module 34 includes one or more angular or linear stages that can be controlled by a alignment control circuit.

For example, in the shown embodiment, the reflector 26 can be tilted with respect to the upper wall and/or moved along the upper wall such that the orientation and/or location of the reflector 26 can be adapted with respect to the radar sensor 32 and/or the antenna 24.

In some embodiments, the alignment module 34 may also run along at least two sides in a continuous manner such that the reflector 26 can be located at different sides within the test chamber 12 if required for testing purposes.

In any case, the alignment module 34 can be used to adapt the position of the reflector 26 with respect to the antenna 24 and/or the test location 30. Hence, different impinging directions of electromagnetic waves can be provided for testing purposes.

The test system 10 further comprises a power sensor 36 that senses the power of a signal provided by the radar sensor 32. The power sensor 36 is connected with a control and/or evaluation circuit or module 38 that receives the power sensed for evaluation purposes.

The control and/or evaluation module 38 is also connected with the first and second radar target simulators 20, 22 for controlling them appropriately as will be described later.

In addition, the control and/or evaluation circuit or module 38 also controls the positioner 28 in some embodiments such that the radar sensor 32 is located and/or orientated in a desired manner.

Furthermore, the alignment module 34 may be controlled by a processing circuit or unit, for example the control and/or evaluation module 38, such that no manual aligning of the reflector 26 is required.

For instance, an equivalent isotropically radiated power (EIRP) of the radar sensor 32 is determined by the test system 10, for example the control and/or evaluation module 38, while using the power sensor 36 and/or the positioner 28 in an appropriate manner (as well as the other components described above).

The FIGURE further reveals that the test system 10, for example the outer housing 14, has an access panel 40 accessible from the outside and a chamber access panel 42 within the test chamber 14. For example, the access panel 40 is provided at the outer side of the outer housing 14.

The access panels 40, 42 provide defined feedthroughs for the respective connections and/or cables required to control the components and to receive signals from the components respectively.

For maintain the temperature within the test chamber 12, the test system 10 also comprises a ventilation system 44 that ensures an air exchange between the interior of the test chamber 12 and the environment in a defined manner in order to remove heat from the interior, thereby reducing the temperature within the test chamber 12.

In addition, the test system 10 has an environment conditioning module 46 that is associated with the test location 30 in order to surround the radar sensor 32 at least partly. The environment conditioning module 46 may be used to set a certain temperature and/or humidity to which the radar sensor 32 is exposed during the testing. The respective temperature and/or humidity set by the environment conditioning module 46 may be different to the temperature and/or humidity within the test chamber 12 in general. Hence, only the quiet zone associated with the test location 30 may be exposed to different environmental conditions due to the environment conditioning module 46. For instance, the environment conditioning module 38 may provide a temperature range from −40° C. up to 85° C.

In general, the control and/or evaluation module 38 may also control the ventilation system 44 and/or the environment conditioning module 46 depending on sensor signals received or rather according to a test scenario applied.

The FIGURE further reveals that the test chamber 12 is located on wheels 48 that are arranged at the outer housing 14 such that the entire test system 10 is a movable one since the test chamber 12 and the components located therein can be moved easily. The respective components located outside can also be carried easily.

Hereinafter, different operation modes of the combined test system 10 described above are discussed in more detail. In general, the antenna unit 16 and the antenna array 18 are configured to be activated independently from each other by the control and/or evaluation module 38, for instance.

The test system 10 is configured to perform a radar calibration. This is associated with a first operation mode in which only the antenna unit 16 is operated. Accordingly, the test system 10 provides calibration capabilities.

The first operation mode corresponds to an angular calibration of the radar sensor 32. This relates to a typical far-field task with one target. For calibration purposes, it is necessary that a plane wave incidents on the radar sensor 32 which can be achieved by the radar unit 16 as described above. Accordingly, the antenna unit 16 together with the first radar target simulator 20 are used in the first operation mode.

The antenna unit 16 provides plane waves at the test location 30 at which the radar sensor 32 is located. For testing the angular behavior, the positioner 28 is controlled appropriately. Additionally or alternatively, the reflector 26 is aligned by the alignment module 34 differently such that the impinging direction of the signals on the radar sensor 32 and vice versa is adapted.

In addition, the test system is configured to perform a multi-target test. This is associated with a second operation mode in which only the antenna array 18 is operated. Accordingly, the test system 10 provides hardware-in-the-loop capabilities.

In some embodiments, the antenna array 18 and the second radar target simulator 22 together are configured to generate multiple dynamic target scenarios for testing the radar sensor 32 with respect to its behavior and/or characteristics in this regard. The test system 10, for example the second antenna array 18 together with the second radar target simulator 22, can be used to identify the minimum angular distance between two simulated targets in order to reliably detect them as two separate targets by the radar sensor 32. In other words, the resolution of the radar sensor 32 to distinguish between two close objects can be evaluated appropriately.

In some embodiments, the second radar target simulator 22 is enabled to simulate several targets wherein the respective signals associated with the several targets are forwarded to the radar sensor 32 by the antenna array 18 having several antennas.

For instance, the radar sensor 32 issues a radar signal that is received by at least one of the reception antennas of the antenna array 18. The radar signal received is forwarded to the control and/or evaluation module 38 for evaluating purposes.

The control and/or evaluation module 38 controls the second radar target simulator 22 to generate respective targets according to a test scenario applied. For instance, four targets shall be simulated that simulate reflections of the radar signal issued by the radar sensor 32. These simulated signals are also called echo signals. The different echo signals are forwarded to the radar sensor 32 by the antenna array 18.

The radar sensor 32 receives the echo signals and processes them internally. The result of the internal processing can be forwarded to the control and/or evaluation module 38 for evaluation purposes, thereby gathering information concerning the characteristics and/or behavior of the radar sensor 32.

In general, the antenna array 18 together with the second radar target simulator 22 are enabled to process signals with a bandwidth up to 4 GHz. In addition, they together support testing of signals in the 24 GHz band, 77 GHz band as well as 79 GHz band which are used for automotive radar testing. Hence, automotive radar sensors 32 can be tested by the test system 10 appropriately.

Furthermore, the test system 10 can be configured to perform an interference test. Hence, the test system 10 comprises an interferer generation circuit or module for simulating an interferer. The interferer generation module may be provided by one of the radar target simulators 20, 22.

For instance, the respective interference signal is issued as a separate signal via one of the several antennas or the signals generated relate to superimposed signals encompassing an interference signal.

Moreover, the test system 10 has a third operation mode in which both the antenna unit 16 and the antenna array 18 are operated simultaneously or rather concurrently.

Alternatively to the shown embodiment that comprises the antenna 24 and the reflector 26 which together establish the antenna unit 16 that provides plane waves at the test location 30, the antenna unit 16 may be established as an antenna array 50 that is configured to provide plane waves at the test location 30 in a synthesized manner. This alternative embodiment is illustrated by dashed lines in the FIGURE.

In some embodiments, the quiet zone can also be established at the test location 30 by the antenna array 50 that comprises several antennas which are controlled by the control and/or evaluation module 38 with regard to phase and/or amplitude such that the antennas each generate a respective wave. The waves generated superimpose with each other in plane waves at the test location 30. Accordingly, the antenna array 50 provides the plane waves at the test location 30 in a synthesized manner.

Accordingly, a single test system 10 is provided that combines several different testing tasks in a compact manner.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A test system for testing a radar sensor, the test system comprising:
    a test chamber for encompassing a radar sensor to be tested, wherein a test location is provided within the test chamber on which the radar sensor to be tested is placed for testing;
    at least one antenna unit;
    at least one first radar target simulator connected to the antenna unit;

at least one antenna array different from the antenna unit; and at least one second radar target simulator connected to the antenna array such that two different radar target simulators as well as two different antenna systems are provided in a single test system, wherein the at least one first radar target simulator is different than the at least one second radar target simulator, wherein the test system has a first operation mode that corresponds to an angular calibration of the radar sensor to be tested which uses a plane wave that incidents on the radar sensor to be tested at the test location, wherein, in the first operation mode, the test system is configured such that only the antenna unit is operated, and in a second operation mode, the test system is configured such that only the antenna array is used for multi-target tests, wherein the test system has an outer housing that limits the test chamber outwardly, and wherein the antenna unit as well as the antenna array are provided in the same test chamber.

2. The test system according to claim 1, wherein the antenna unit comprises a reflector and an antenna associated with the reflector such that plane waves are provided at the test location.

3. The test system according to claim 2, wherein the reflector is located within the test chamber at an upper side of the test chamber, wherein the upper side is opposite to a lower side that is assigned to the test location.

4. The test system according to claim 2, wherein an alignment module for the reflector is provided within the test chamber.

5. The test system according to claim 1, wherein the antenna unit comprises an antenna array that is configured to provide plane waves at the test location in a synthesized manner.

6. The test system according to claim 1, wherein the antenna array and the second radar target simulator together are configured to generate multiple dynamic target scenarios for testing the radar sensor to be tested.

7. The test system according to claim 1, wherein the antenna array comprises several transmission antennas and several reception antennas.

8. The test system according to claim 1, wherein the test system comprises a power sensor that is configured to sense the power of a signal provided by the radar sensor to be tested.

9. The test system according to claim 1, wherein a movable positioner for the radar sensor to be tested is provided, wherein the test location is assigned to the positioner, and wherein the positioner is configured to move the radar sensor within the test chamber.

10. The test system according to claim 1, wherein the outer housing comprises an access panel at its outer side, and wherein a chamber access panel for the radar sensor to be tested is provided within the test chamber.

11. The test system according to claim 1, wherein the test chamber is an anechoic chamber or a shielded chamber, and wherein the antenna unit as well as the antenna array are provided in the same test chamber.

12. The test system according to claim 1, wherein the test system comprises a ventilation system that is assigned to the test chamber for ventilating an interior of the test chamber.

13. The test system according to claim 1, wherein the test system comprises an environment conditioning module that is assigned to the test location, wherein the environment conditioning module is configured to adapt an environmental condition for the radar sensor to be tested in a defined manner.

14. The test system according to claim 1, wherein the antenna unit and the antenna array are configured to be activated independently from each other.

15. The test system according to claim 1, wherein the test system comprises a third operation mode in which the antenna unit and the antenna array are operated simultaneously.

16. The test system according to claim 1, wherein the test system is configured to perform a multi-target test and a radar calibration.

17. The test system according to claim 1, wherein the test system comprises a control and/or evaluation module that includes one or more circuits.

18. A test system for testing a radar sensor, the test system comprising:
a test chamber for encompassing a radar sensor to be tested, wherein a test location is provided within the test chamber on which the radar sensor to be tested is placed for testing;
at least one antenna unit;
at least one first radar target simulator connected to the antenna unit;
at least one antenna array different from the antenna unit; and
at least one second radar target simulator connected to the antenna array,
wherein the at least one first radar target simulator is different than the at least one second radar target simulator, and
wherein the antenna array together with the second radar target simulator provides a bandwidth up to at least 5 GHz,
wherein the test system has an outer housing that limits the test chamber outwardly, and wherein the antenna unit as well as the antenna array are provided in the same test chamber.

19. A test system for testing a radar sensor, the test system comprising:
a test chamber for encompassing a radar sensor to be tested, wherein a test location is provided within the test chamber on which the radar sensor to be tested is placed for testing;
at least one antenna unit; at least one first radar target simulator connected to the antenna unit;
at least one antenna array different from the antenna unit; and at least one second radar target simulator connected to the antenna array,
wherein the at least one first radar target simulator is different than the at least one second radar target simulator,
wherein a movable positioner for the radar sensor to be tested is provided, wherein the test location is assigned to the positioner, and wherein the positioner is configured to move the radar sensor within the test chamber,
wherein the test system has an outer housing that limits the test chamber outwardly, and wherein the antenna unit as well as the antenna array are provided in the same test chamber.

\* \* \* \* \*